United States Patent [19]

Simmering

[11] Patent Number: 5,455,959
[45] Date of Patent: Oct. 3, 1995

[54] SYSTEM FOR COLLECTING FROM MASTERS INFORMATION INDEPENDENTLY COLLECTED FROM ASSOCIATED SLAVES IN SHELVES OF A TELECOMMUNICATIONS TERMINAL

[75] Inventor: Marlin V. Simmering, Wendell, N.C.

[73] Assignee: Alcatel Network Systems, Inc., Richardson, Tex.

[21] Appl. No.: 293,093

[22] Filed: Aug. 19, 1994

Related U.S. Application Data

[63] Continuation of Ser. No. 844,134, Mar. 2, 1992, abandoned.

[51] Int. Cl.⁶ .............................. G06F 13/38; G06F 13/22; H04L 12/403
[52] U.S. Cl. .............................................................. 395/800
[58] Field of Search .............................. 395/325, 800, 395/725, 275; 370/85.5, 85.8; 364/132; 340/825.06, 825.07, 825.08, 825.21

[56] References Cited

U.S. PATENT DOCUMENTS

| | | | |
|---|---|---|---|
| 4,494,111 | 1/1985 | Rocci et al. | 340/533 |
| 4,568,909 | 2/1986 | Whynacht . | |
| 4,578,773 | 3/1986 | Desai et al. | 395/725 |
| 4,635,195 | 1/1987 | Jeppesen, III et al. | 395/750 |
| 4,712,213 | 12/1987 | Warwick et al. | 371/15 |
| 4,726,017 | 2/1988 | Krum et al. | 370/85 |
| 4,890,279 | 12/1989 | Lubarsky | 370/58.1 |
| 4,905,182 | 2/1990 | Fitch et al. | 395/275 |
| 4,924,461 | 5/1990 | Amemiya et al. | 370/95.2 |
| 4,942,550 | 7/1990 | Murray | 395/275 |
| 4,992,976 | 2/1991 | Yonekura et al. | 395/500 |
| 5,038,140 | 8/1991 | Ikeuchi | 340/825.02 |
| 5,038,317 | 8/1991 | Callan et al. | 395/325 |
| 5,065,314 | 11/1991 | Maskovyak | 395/325 |
| 5,161,151 | 11/1992 | Kimura et al. | 370/13 |
| 5,166,675 | 11/1992 | Amemiya et al. | 340/825.08 |
| 5,237,676 | 8/1993 | Arimilli et al. | 395/550 |
| 5,261,115 | 11/1993 | Saunders et al. | 395/800 |
| 5,301,346 | 4/1994 | Notavianni et al. | 395/800 |

*Primary Examiner*—Krisna Lim
*Attorney, Agent, or Firm*—Ware, Fressola, Van Der Sluys & Adolphson

[57] ABSTRACT

An automatic inventory retrieval system collects inventory and status information regarding the presence or absence of plug-in master and slave units in the slots of various shelves in a telecommunications terminal, such as a network element, by having independent masters in each shelf polling associated slaves at a relatively frequent polling rate and collecting information for storage until reception of a relatively infrequent master polling signal provided from a network control unit to all of the shelves. Communication between the control and the various shelves is provided over a balanced serial link interface comprising differential pairs, whereas communications internal to the shelves and the network control may be by means of single-ended signals. Redundancy in the network element is accommodated with a single serial link between the central control and the shelves by use of time-division multiplexing. The relatively frequent slave address polling in the shelves may be done on the order of every several hundred milliseconds or less, whereas the relatively infrequent polling of the master units in the shelves by the central control occurs at a frequency on the order of once every second or more.

2 Claims, 5 Drawing Sheets

SYSTEM FOR COLLECTING FROM MASTERS INFORMATION INDEPENDENTLY COLLECTED FROM ASSOCIATED SLAVES IN SHELVES OF A TELECOMMUNICATIONS TERMINAL

This is a continuation of application Ser. No. 07/844,134 filed on Mar. 2, 1992 now abandoned.

CROSS REFERENCE TO RELATED APPLICATION

Co-pending patent application U.S. Ser. No. 08/290,619 filed Aug. 15, 1994 entitled "Multiple Function Micro Controller and Apparatus for Using the Same" discloses subject matter which is related to the subject case and is hereby incorporated by reference.

This specification discloses subject matter which is disclosed and claimed in co-pending application U.S. Pat. No. 5,323,145, issued Jun. 21, 1994 filed on the same day as this application. That case is hereby incorporated by reference.

TECHNICAL FIELD

This invention relates to telecommunications systems, and, more particularly, to a method and means of retrieving inventory and alarms electronically.

BACKGROUND OF THE INVENTION

A cross-connect core for a telecommunications network of cross-connects may require a high density span termination system that transceives data. Such may be incorporated in a shelf consisting of a mechanical structure, back plane assembly, cabling, connectors and miscellaneous mechanical hardware. It may be designed to mount in a rack for containing a variable number of plug-in units which may be of different types. It may be designed so that no particular loading order is required so that in depopulated shelves, printed board assemblies may be plugged-in in any desired position.

One of the positions may be designed to accept a system alarm unit, for example, in the form of a plug-in printed board assembly. Such may be powered from a battery in a central office using a common return, for example. The shelf metal work may be connected to frame ground.

One or more of such termination systems may be connected to a cross-connect core for switching low speed signals such as DS-1 signals into and from a DS-1 interface of a high speed transport frame such as OC-1 for transmission to other cross-connects at other locations.

A basic requirement of such a termination system is to provide a low cost method of retrieving inventory (a record of plug-in unit types) electronically. Because there may be many such termination system units connected to a single cross-connect core, it may be burdensome for the network control therein to assume any inventory and alarm retrieval tasks on a regular basis. Moreover, at the beginning at least, not all of the unit positions in a given shelf will be used and an inventory and retrieval architecture must thus be designed to allow for growth while at the same time not overburdening system computational requirements at the early stage. And, it would be desirable to accomplish all of this at low cost. Thus there is a primary problem in designing an architecture that must provide basic electronic inventory and alarm retrieval at a low cost for an initial product while allowing the system to be upgraded with later plug-in unit options so the system supports electronic provisioning (electronically controlling a units transmission parameters and/or functionality).

Secondly, because of a potential for a large number, e.g., sixteen termination systems that may be connected to the cross-connect core, the architecture must minimize the amount of additional processing required by the telecommunication system network element which, without limitation, in the case illustrated, is a loop carrier cross-connect core having a dual network controller that carries out the network control function.

Lastly, the architecture should be of such a design, that it allows processors of various types and computational power to communicate over any interface therein.

DISCLOSURE OF INVENTION

According to the present invention, separate pluralities of slaves are polled for status information by means of associated masters at a first periodic rate, on the order of hundreds of milliseconds, while the associated masters are polled for the status information at a second periodic rate on the order of seconds.

In further accord with the present invention an apparatus for carrying out the present invention may comprise a plurality of slave units, each having a selected address and each being responsive to relatively frequent slave address polling signals from an associated master unit, each slave providing, in response to a matching slave address and slave address polling signal, a slave response signal containing selected status information wherein the master is responsive to the slave response signals for providing selected slave response signals in response to a relatively infrequent master unit address polling signal, the master unit having a selected master address.

A network control may provide the master unit address signal and may be responsive to the selected slave address status response signals from the master unit. Moreover, a plurality of master units and associated slave units may be connected to the network control for inventory and alarm retrieval purposes as outlined above.

In an existing cross-connect core product of assignee, for example, a high speed multi-processor serial interface may be used as the point of interface for a plurality of termination systems each having a master and associated plurality of slaves. Thus, the control connected to the high speed multi-processor serial interface within several of assignee's existing products may be used to connect a plurality of termination systems and may poll the masters in each termination unit at a relatively infrequent rate, e.g., every 5 seconds, while the individual masters within each termination unit poll their associated slaves at a much higher rate, e.g., on the order of every 200 milliseconds.

In the assignee's existing products, the multi-processor serial interface is actually redundant. According further to the present invention, the multi-processor serial interface may be multiplexed from the cross-connect core to a single bus to reduce cost and complexity of wiring. Thus, the connection between the multi-processor serial interface and the various termination system units comprises a time multiplexed single serial bus version of the separate, redundant buses within the core itself.

Also, according to the present invention, the single-ended TTL levels of the redundant buses within the core may be converted to differential pairs, one pair for the transmit direction and another pair for receive. Such a bus, may be characterized as a balanced serial link interface (BSLI) which may be compatible with the Electronic Industry Association (EIA) RS-485 standard. At the other end of the BSLI, i.e, at the termination units, the balanced pairs may be converted to single-ended TTL levels for processing by the master alarm units in each termination unit. The master units may also transmit response messages to the network controller within the cross-connect core over the BSLI.

Within the termination units themselves, a data link for inventory and alarms may be provided by a bus similar to the multi-processor serial interface but operating at a lower speed which may be called the low speed serial link interface (LSSLI). The LSSLI may use single-ended TTL level transmit and receive lines, operating at for example, 32 kb/s as opposed to for example, 128 kb/s for the multi-processor serial interface.

The master alarm unit within each termination unit collects and stores inventory and alarms from all other slave units in the shelf independently of the network controller within the cross-connect core. The cross-connect core network controller periodically polls the master units to determine if any changes have occurred in the status of the shelves plug-in units. If not, no additional data need be transferred.

These and other objects, advantages and improvements according to the present invention will become apparent in light of the detailed description of a best mode embodiment thereof and in light of the drawing which is described in brief below.

BEST MODE OF THE INVENTION

Figure 1:
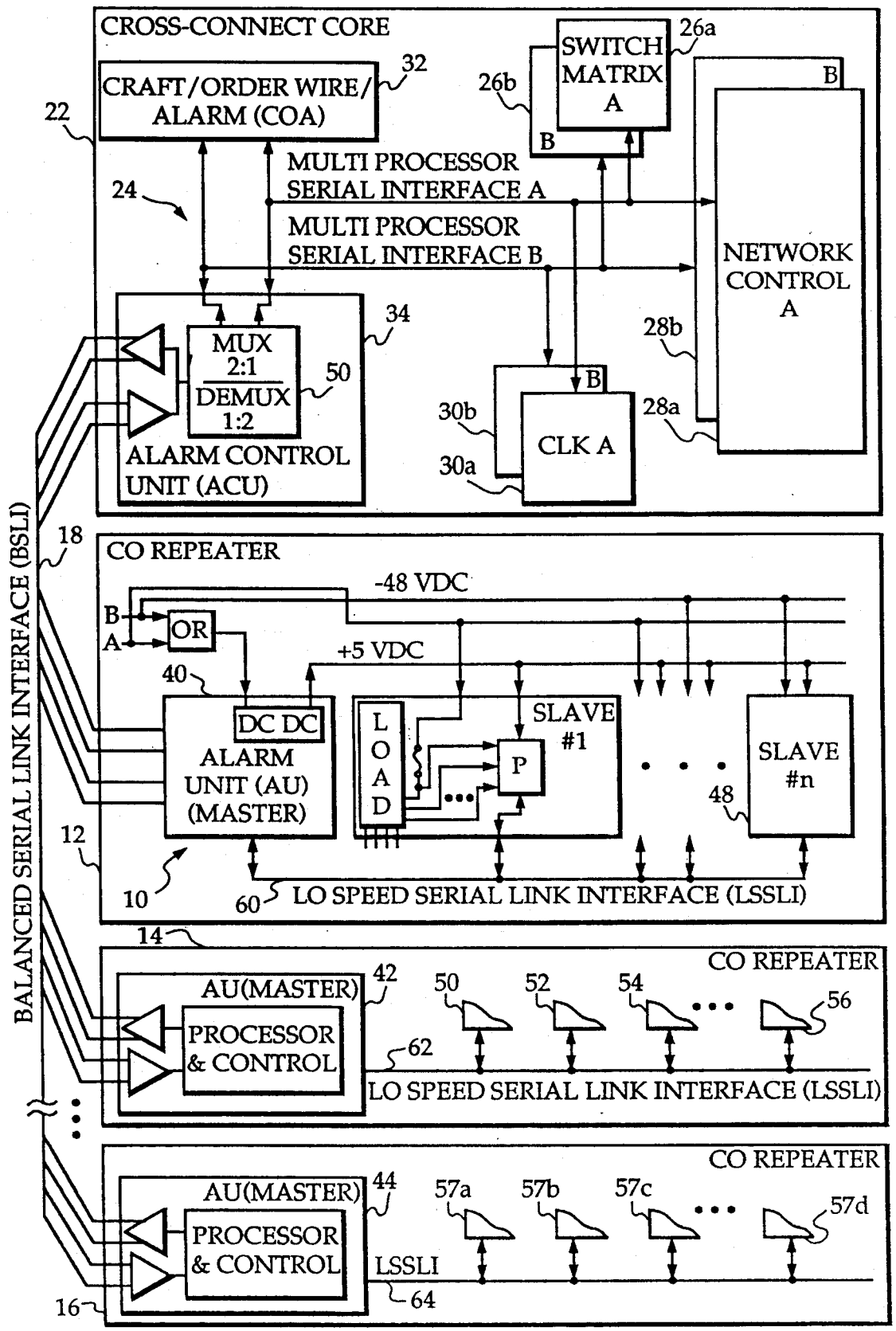
FIG. 1 is an illustration of a network control interconnected to a plurality of master units each having a plurality of slaves associated therewith.

In FIG. 1, an alarm collection and inventory architecture 10 is shown in detail within a central office (CO) termination shelf 12 which, among a plurality of shelves 14, . . . , 16, which, together with a balanced serial link interface (BSLI) 18 comprise an alarm collection and inventory retrieval architecture 20, according to the present invention. Although the architecture is shown in the context of a cross-connect it should be realized that it could be used elsewhere as well.

A cross-connect core 22 includes a multi-processor serial interface 24 which communicates with a switch matrix 26a, 26b (which is shown as being redundant but need not be), a redundant network control 28a, 28b (which need not be redundant), a clock 30a, 30b, a COA 32 and an alarm control unit (ACU) 34.

The cross-connect core is shown having an architecture which is peculiar to and common within a product line of Assignee hereof. However, it should be understood that the architecture of such a cross-connect core need not be exactly as shown in the figure but could be arranged in any number of different ways to accomplish the cross-connect function thereof. It should also be understood that the cross-connect core 22 contains many other functional blocks which are not shown here because of a lack of relevance to the present invention. Nevertheless, various patents and co-pending applications of Assignee describe such cross-connect functional elements such as U.S. Pat. No. 5,060,229 entitled "Serial Transport Frame Format Method"; U.S. Pat. No. 5,014,268, entitled "Parallel Timeslot Interchanger"; U.S. Pat. No. 5,161,152, entitled "High Speed Synchronous Transmission Access Terminal"; and U.S. Pat. No. 5,185,736, entitled "Synchronous Optical Transmission System", among others cross-referenced therein, all of which are hereby incorporated by reference. Also incorporated by reference is U.S. Ser. No. 08/290,679, filed Aug. 15, 1994, entitled "Multiple Function Micro-Controller and Apparatus for Using the Same" which performs multiple functions including inventory functions.

Although we provide a description of the multi-processor serial interface protocol hereinafter, it should be realized that various other protocols, communication topologies, physical layers and data link layers may be provided equally well for other embodiments of the present invention. In other words, the role of the cross-connect core, in the present invention is of minor importance and various other similar devices may be used in a way that takes advantage of the teachings hereof which primarily involve the alarm collection architecture 10 of the termination shelves and the inventory retrieval architecture 20 with respect to the termination shelves or similar devices which need to be inventoried or have their alarm informations collected by a network controller.

In light of the above therefore, the communication topology of the particular cross-connect core 22 used in the embodiment shown herein, is multi-drop line with one master and multiple slaves. In other words, the network control 28a, 28b is the master with the switch matrix 26a, 26b, the clock 30a, 30b, the COA 32 and the ACU 34 being the slaves.

For the procedural interface of the physical layer, the unit of information is the word. A word is composed of eleven bits and the sequence of bits is to start with the start bit which is always zero, eight data bits starting with the least significant bit, a frame start bit and a stop bit which is always one. The bit rate of the word is 128 kHz and is compatible with 8051 (Intel micro-controller).

At the data link layer, the frame format, comprising the unit of information in this layer, consists of five words beginning with word zero and ending with word four. Word zero is defined as the word with frame start bit equal to one. All other words in the frame must have the frame start bit set to zero. Each word in the frame follows each other word without any time gap.

Figure 2:
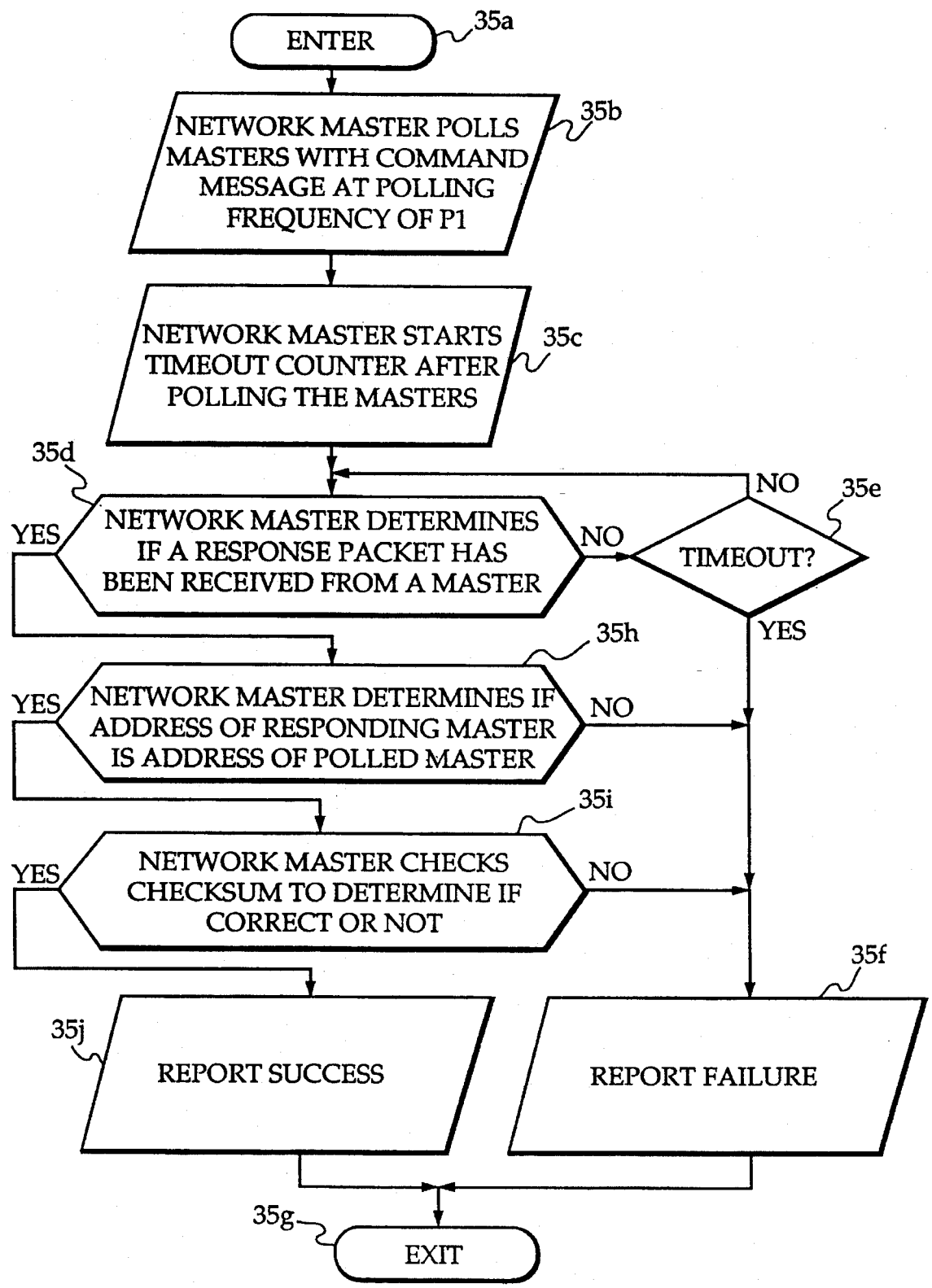
FIG. 2 is an illustration of a series of steps carried out by the network control in polling the masters.
Figure 3:
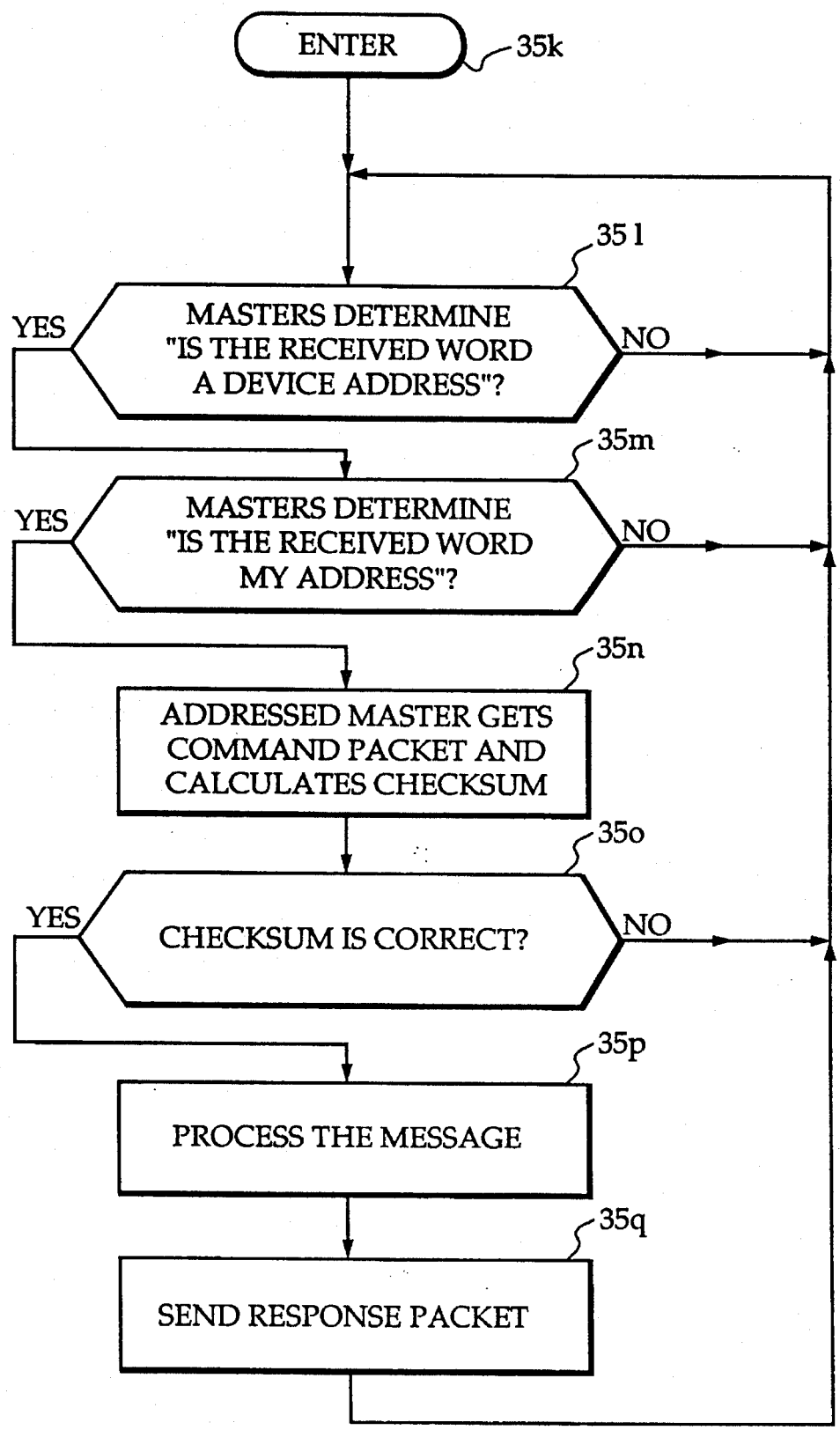
FIG. 3 is an illustration of a series of steps carried out by the individual masters in responding to the polling command from the network controller.

Communication is initiated by the master by sending a command frame. The command frame is decoded by all the slaves, the selected slave answers the master by sending a response frame in a predefined time interval. The master cannot send another command before it receives response to the previous one or timeout occurs. The network control master protocol algorithm is shown in FIG. 2 and the slave (alarm unit) protocol algorithm is shown in FIG. 3. The network control polls the alarm units relatively infrequently, e.g., on the order of seconds, e.g., once every five seconds.

Thus, after entering in a step 35a, the network master polls the alarm units in the shelves, as shown in a step 35b and starts a timeout counter, as indicated in a step 35c. A step 35d determines if a response packet has been received from a master and, if not, whether the timeout counter has expired or not, as indicated in a step 35e. If no response packet has been received from an alarm unit master and timeout has not yet occurred, then the steps 35d, 35e are repeated until a response packet is received or timeout occurs. With timeout, a failure is reported, as indicated in a step 35f, and an exit is made, as indicated in a step 35g. On the other hand, if a response is received, a step 35h is next executed in order to determine if the address of the responding alarm unit master is the address that was polled in the step 35b. If not, a failure is reported, as indicated in the step 35f, and an exit is made in the step 35g. If the responding alarm unit master address matches that of the polled master, a step 35i is next executed to determine if a checksum related to the received response packet is correct or not. If not, a failure report is made, as indicated in a step 35f and an exit made in step 35g. If the checksum is correct, then a success is reported, as indicated in a step 35j, and an exit is made, as indicated in the step 35g.

From the perspective of each of the alarm unit masters, as indicated in FIG. 3, the routine used for responding to polling queries from the network master, after entering in a step 35k, first determine in a step 35l whether a received word from the network master is a device address. If not, the step 35l is repeated endlessly until a received word is recognized as being a device address. Once this occurs, a step 35m is next executed in which each master determines if the received address word is its own address. If not, step 35l is again executed. If so, the address master obtains the command packet and calculates a checksum, as indicated in a step 35n. If correct, as determined in a step 35o, the message received from the network master is processed, as indicated in a step 35p, and a response packet is sent back to the network master, as indicated in a step 35q. The step 35l is then re-executed. If the step 35o determines that the checksum is not correct, the step 35l would be re-executed directly, and no message processing and no response would take place. The timeout of step 35e of FIG. 2 would then ultimately occur, and a failure reported, as described above.

For embodiments in the context of assignee's product line, network control 28a, 28b performs a remote inventory function. When the equipment inventory status is requested, the network control 28a, 28b will request the installed plug-in units in the repeaters 12, 14, . . . , 16 to provide unit base mnemonics and locations along with software part numbers and revision levels.

Various addresses may be assigned to the various units in a given cross-connect core. For example, the ACU 34 may be given an address Ex, the clock unit an address of 8x, and the COA unit may be given an address of xx. Each of these addresses may be accessed by the network control.

For message coding, commands and responses may have similar structures such as previously described in connection with the procedural interface, i.e., having word units composed of eleven bits arranged in five word frames. The first word may include the device address and a function code followed by a page number word and three subsequent words including the information for a given page number. For example, the ACU address Ex can be used as a device address and a functional code of 1110 can be assigned to a remote inventory functional code. This functional code may be used to retrieve the remote inventory information. The next word may comprise an eight bit page number, for example covering pages anywhere from 0 through 128. These pages may be given various meanings which can be interpreted in any remote inventory informational structure that is desired. For example, page number 0 may mean a read storage format. Page number 1 could read the digits 3 and 4 of manufacturer I.D. while digits 1 and 2 of the manufacturer I.D. might be contained in page number 2. A supplier code could be covered by page number 3. A unit part number may be covered by several pages as well as a serial number, a CLEI code, a programmed date, a revision level, a checksum, an inservice log function, etc.

In response, the unit being queried will respond with the requested information with data organized in a similar five word frame format, for example, using the first two words to echo back data received on the input frame and using the remaining words to send the information requested according to the function.

Alarm units 40, 42, . . . , 44, each contain a processor and control unit including memory for storing the data required by the remote inventory function. The storage format may be a two digit alpha/numerical character that permits the information to be stored in an EEPROM, for example, in different formats for different products. For example, a group of products might use a format "01" and a subunit such as a line card might have a format "02".

For each inventory retrieval request after a checksum is verified, the storage format may be checked. If the storage format is unknown, an error message may be returned and the process terminated. The message sent to read the storage format in the particular embodiment shown is to request page number 0 in the command message while the response contains the second and first digits of the storage format in the third and fourth words of the response frame. This is just one example of the various types of inventory commands and responses that have been described previously and need not concern us here.

It will be observed that the alarm control unit 34 contains a multiplexer/demultiplexer 50 responsive as a 2:1 multiplexer to both of the redundant halves of the multi-processor serial interface 24 and responsive as a 1:2 demultiplexer to incoming messages on a balanced serial link interface (BSLI) 18. Rather than connecting both halves of the multi-processor serial interface in a physically separable way, i.e., by running separate wires for each redundant bus to each of the shelves, the present invention teaches the use of a multiplexer/demultiplexer 50 which is capable of switching both redundant buses into one serial bus (and vice versa) so that the redundancy at least at the data level is retained, if not physically. This provides a low cost approach to inventory retrieval and alarm collection. Using this approach, the termination shelves may be redundant or not, as desired. If not, the information is merely duplicative rather than truly redundant.

The ACU 34 is connected to each of the CO termination shelves 12, 14, . . . , 16, by means of the balanced serial link interface (BSLI) 18 to form an alarm and inventory retrieval architecture 20, according to the present invention.

The multi-processor serial interface 24 may be a single-ended TTL signal which is inappropriate in the context of the embodiment for connecting the shelves to the cross-connect core since a more robust signal happens to be required for the distances involved. Therefore, according to the embodiment hereof, a balanced serial interface link 18 is provided. The BSLI represents the single ended TTL signals as a differential pair, one pair for the transmit direction and another pair for receive. This bus is EIA RS-485 compatible, providing the capability to drive up to sixteen repeaters.

Each shelf includes provision for multiple plug-in units so that the system can take a small or a large number of slave units 46, . . . , 48. Because up to sixteen shelves may be accommodated in the particular embodiment shown, according to the present invention, it would be overly burdensome for the network control 28a, 28b to have to individually poll each slave in each shelf, considering for the embodiment shown that there may be up to twenty-nine different slaves with one master alarm unit in each shelf. Thus, according to the present invention, in order to minimize the amount of additional processing required by the network control, in this embodiment located in a telecommunication system network element 22, the each alarm unit 40, . . . , 42, 44 is given the task of supervising inventory retrieval and alarm collection for the individual slaves associated with its particular shelf. Thus, the alarm unit 40 in shelf 12 is in charge of slaves 46, . . . , 48 while the alarm unit 42 in shelf 14 is responsible for slaves 50, 52, 54, . . . , 56, and so on. Moreover, it should be understood that the interface described is of such a design that it allows processors of different types and computational power, not necessarily the same type of unit in every case, to communicate over this interface.

At the shelf end of the BSLI 18, the alarm units 40, 42, . . . , 44 connect to the balanced pairs and convert the signals to single-ended TTL levels on a LSSLI bus 60 and back again. These signals are received and processed by the alarm units. Thus, the alarm units also transmit response messages from the slaves to the network control 28a, 28b.

Thus, within each of the shelves 12, 14, . . . , 16, there is a separate low speed serial link interface 60, 62, . . . , 64, for collecting inventory and alarms (from addressable slaves) which operates at a lower speed than the multi-processor serial interface 24 in the cross-connect core 22. For example, the multi-processor serial interface 24 might operate at 128 kb/s while the low speed serial links might operate at 32 kb/s. The LSSLIs use single ended TTL level transmit and receive lines. The alarm units 40, 42, . . . , 44 collect and store inventory and alarms from all of their associated slave units in their respective repeaters independently of the network control 28a, 28b.

The network control 28a, 28b periodically polls, e.g., every 5 seconds, the alarm units 40, 42, . . . , 44 to determine if any change has occurred in the status of the particular shelf's plug-in units. If not, no additional data need be transferred and the computational burden on the network control is tremendously reduced.

Thus, the alarm units use the low speed serial link interfaces to communicate with other units in the shelf. This bus may operate at 32 kb/s, but otherwise is similar to the core's MSI in structure and protocol. The alarm unit is the bus master and all other devices are slaves. The alarm unit initiates all LSSLI transmissions, sending a data burst containing the address of, and data for the target slave. The slave responds by executing the command and returning a transmission containing any requested data. The polling rate may be on the order of, e.g., hundreds of milliseconds, e.g., every two hundred milliseconds.

In addition to performing bit rate and electrical signal format conversion between the MSI and LSSLI, the AU is also intended to off load the processing required at the core. To accomplish this, the AU continuously updates a local record of each plug-in within its respective shelf, reducing the network control processing load and the core's MSI bus traffic. The AU services requests for data from the network control on an interrupt basis. It may include an 80C31 micro-controller as the processor. It may include a watchdog timer to detect the loss of processor sanity, a store memory with, for example, a minimum of 16 kbits of nonvolatile external program storage memory for access by the AU processor and, for example, a minimum of 4 kbits of external data memory for access by the AU processor. Two serial interface ports are required on the AU. One port is connected to the BSLI 18 to provide the network/AU link and the second port connects to the LSSLI 60, allowing inventory and alarm retrieval. The AU may be set up to appear as a slave unit to the core 22 and may transceive data at 128 kb/s over the BSLI interface. The AU may communicate with the core using a selected type code and fixed address. The second, i.e., LSSLI port, is required to interface the slave thereto. There, the AU may transceive serial data at 32 kb/s and according to the protocol to be described below.

As mentioned, the inventory of the AU is performed on the LSSLI bus that collects inventory from the slaves. The AU incorporates an LSSLI transceiver connected to appear as a bus slave device to the AU processor.

The AU may monitor both an A and B −48 volt battery distribution/bus via two of the LSSLI transceiver alarm status inputs. In that case, the AU forwards the battery (assuming, without limitation, a central office battery supply) status to the network control 28a, 28b when requested by a network control alarm query command. The AU processor may read the status of either the A or B −48 volt power distribution via a device and status command. The status of the A power distribution bus may, for example, be transmitted in status bit position one and that for the B bus in status bit position two.

The AU may interface to the LSSLI using four signals. Such signals may include "transmit data", "receive data" "4 MHz oscillator" and "reset". The AU may operate using nominal −48 volt DC power and to minimize down time, the unit may OR the −48 volt A and −48 volt B power distributions. The ORed distributions may feed a single fuse.

According to the present invention, a separate voltage supply, such as +5 volt DC, is generated from the main distribution bus, e.g., −48 volts DC, by a DC to DC power converter which may be within the AU. This supply is used to power on-board circuitry and, according to the invention, to source power to one or more or all of the slave devices within the particular shelf associated with the AU. This powering scheme eliminates nuisance alarms caused by "hot signals" which might otherwise already be on the back plane when the AU is inserted. The powering scheme also has advantages when detecting power failure alarms on the slave units.

In the embodiment shown, because of the plug-in units' limited number of pins, power and cost considerations, previously used methods to detect alarms when plug-in units lost power were not efficient. The present architecture solves this problem and yields other benefits. In this architecture, each slave unit is individually powered from the −48 volt shelf battery distribution bus. However, the alarm unit is common in that it sources power (+5 volts generated by the alarm unit) to all the other slave units in the shelf. The alarm unit also drives the LSSLI inventory bus in transmitting data to and receiving data from the slaves. Because each slave's alarm monitoring circuit is independently powered by the alarm unit's +5 volt source, when one or more slaves lose power (from the −48 volt distribution) their alarm monitoring circuits remain functional. Since half the slaves may be powered by the A −48 volt DC bus and the other half by the B −48 volt DC bus, half the units will remain fully on-line even though half may lose most functions. This system allows any slaves loss of power to be detected by its alarm monitor circuit and reported (transmitted) to the alarm unit via the inventory bus.

A side benefit of this power scheme is the reduced possibility of CMOS circuit latchup as a result of the scheme eliminating "hot signals" on the back plane, as previously discussed when the AU is inserted.

The LSSLI interface protocol will now be described. As mentioned above, the low speed serial link interface is a multi-drop link that transfers data between the bus master (AU) and up to a maximum of 32 slaves, for example. The bus operates in a byte synchronous-bit asynchronous mode, at 32 kb/s. Two lines, one for transmit and one for receive may be used to carry data between the master and slaves. The master retrieves data by sending commands to the slaves and then waiting for a response. A slave may transmit information only after receiving a request from the master.

With respect to bus contention, since all transmit outputs are multiplied, only one slave is allowed to drive the bus at a time. Prior to the start and after the end of a transmission, the addressed slave sets its transmit output to a high impedance state. All other unaddressed slaves must set their transmit output to a high impedance state. To assure that the bus remains in a high state when all slaves are tri-stated the master pulls the bus to logic high.

With respect to data synchronization, as mentioned earlier, the LSSLI bus operates in a byte synchronous-bit asynchronous, meaning that each word is individually synchronized but each bit within the word is captured asynchronously. This synchronization technique requires the transmitter and receiver clocks only to be accurate enough to reliably clock in one data word, since resynchronization will occur for each subsequent word. This allows flexibility in the number of words that may be contiguously strung together to form broader transmission bursts without requiring increased clock accuracy.

Each shelf 12, 14, . . . , 16, implementation should provide a distributed clock to all slave devices sourced by the master. Since all transmitters and receivers are then clocked by the same source, effects of drift and jitter are virtually eliminated. The nominal frequency of the distributed clock may be, for example, 4.096 MHz. Each slave may be identified by a 5 bit binary address.

With regard to the software topology for the LSSLI bus in the embodiment shown, the word format is the basic unit of information which is composed of 11 bits. The sequence of bits may be defined as a start bit followed by 8 data bits, an address/data bit and a stop bit. The address/data bit identifies the word as containing address information or data information. The last (stop) bit is always a logic one that marks the end of the word and readies the bus for the next start bit transition.

With regard to frame format, hierarchically, in the embodiment shown, the frame is a broader unit of information than the word. A frame may be composed of six words containing a first word in the form of an address word and all subsequent words containing data or checksum information.

With respect to error timing, communication is initiated by the master sending a command frame to a slave. The slave then responds by returning a response frame to the master within a predefined time period. The master cannot send another transmission until either the response frame is received or a timeout occurs. The errorproofness of the interface is ensured by the master sending the command frame a selected number of times, e.g., three times every 60 milliseconds, in the absence of a response.

Due to the repetitive send behavior of the slaves, there can be no history-based responses in a slave's response algorithm unless a slave's maximum number of retries is limited to one. This is required to prevent the transmission of corrupted data to the master.

Figure 4:
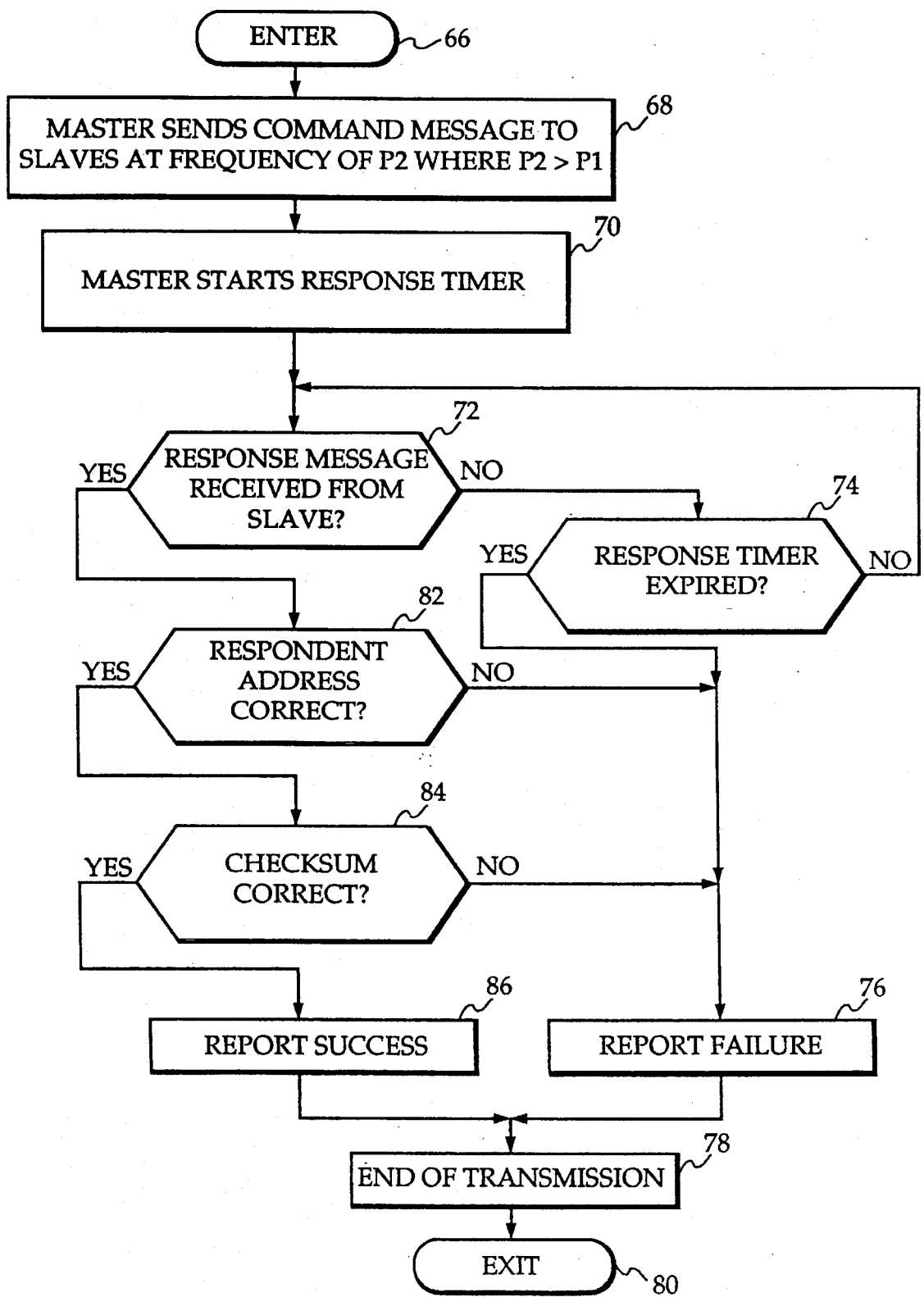
FIG. 4 is an illustration of a series of steps carried out by each master in polling their associated slaves.
Figure 5:
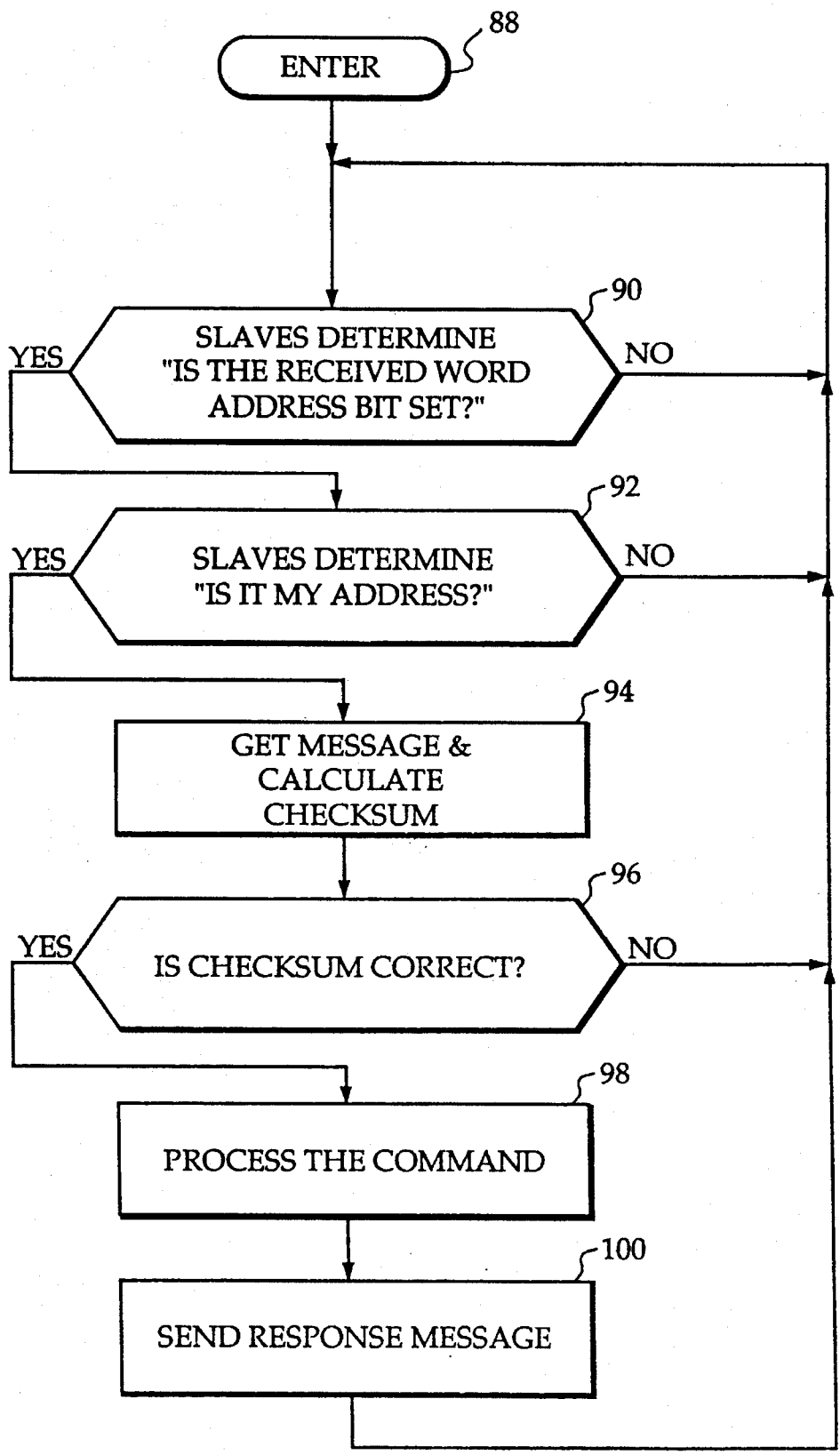
FIG. 5 is an illustration of a series of steps carried out by each slave in responding to polling signals from their associated masters.

The master protocol algorithm is shown in FIG. 4 while the slave protocol algorithm is shown in FIG. 5. As mentioned, the polling rate may be selected at any convenient rate such as on the order of hundreds of milliseconds, say, every 200 milliseconds.

Referring first to FIG. 4, after entering in a step 66, a given alarm unit master 40 sends a command message to each of its associated slaves, as indicated in a step 68, at a polling frequency greater than the frequency with which the alarm unit masters are polled by the network control. The repetition rate of the master polling may be on the order of hundreds of milliseconds, while that of the network control may be on the order of seconds. After the master sends the command message to the slaves on the low-speed serial link interface, the master starts a response timer, as indicated in a step 70, to determine whether the particular polled address is present or not. If no response is received during a particular polling cycle, a pair of steps 72, 74 report a failure, as indicated in a step 76, and that particular polling cycle will be ended, as indicated in a step 78, after which an exit is made in a step 80. If one of the slaves responds to the polling address from the master within the timeout period, as determined in the step 72, a determination is next made in a step 82 whether the responding slave is responding with the correct address. If not, a failure is reported in the step 76, and the polling cycle ended, as indicated in the steps 78, 80. After a determination in step 82 that a slave at the correct address has responded to the command message sent out in step 68, then a checksum is calculated in a step 84. If correct, success is reported in a step 86, and the transmission is ended and the routine exited, as indicated in steps 78, 80. If the checksum is not correct, a failure is reported in the step 76, the transmission is ended and the routine exited in the steps 78, 80.

Turning now to FIG. 5, each of the slaves in a shelf will execute the steps shown. After entering in a step 88, a step 90 is executed, in which a slave determines if the command message sent in step 68 of FIG. 4 is an address. If not, step 90 is executed repeatedly until an address command message is received. Once this occurs, a step 92 is executed by the slave to determine if the received address is its own address. If not, step 90 is again executed. If it is the address of the slave, a step 94 is executed to get the rest of the message and calculate a checksum. Once this is done, a step 96 is executed to determine of the checksum is correct or not. If not, step 90 is again executed, and command processing ceases without any response being sent. In that case, the response timer of the loop 72, 74 of FIG. 4 would timeout and an failure reported in step 76. If the checksum is correct, a step 98 would next be executed and the command processed. A response message is then sent back to the alarm unit master 40 on the low-speed serial link interface 60, for example, by a slave 48. The step 90 is again executed.

As mentioned, low speed serial link interface transceiver is included in each alarm unit and slave as an economical micro-controller with software tailored to implement the LSSLI protocol. The software can perform read/write operations to a 93C46 EEPROM via I/O port D. This combination of hardware and software (herein referred to as the transceiver) does not fully exploit the intended uses of the LSSLI bus.

The transceiver implements the following functions:

1. Provides read access to any of the EEPROM locations.
2. Provides write access to any EEPROM location using a guarded protocol.
3. Transmits the processor device type and software version codes to the master.
4. Provides an unprotected write command for updating the inservice register.
5. Supports format 03 and 04 EEPROM data storage formats.
6. Retrieves three alarm/status bits with a fourth made available by adding an external AND gate.
7. Provides a software restart command.
8. Provides a data loopback command for verifying link integrity.

The bus master may communicate with any slave using the transceiver, according to the protocol to be described above as in FIGS. 4 and 5.

As suggested, the command and response definitions may be selected in a manner similar to those described already in connection with the multi-processor serial interface.

The command and response definitions may include loopback functions wherein a loopback command causes all received data to be captured and retransmitted. All data in the command is echoed in the response. In the particular embodiment described above, the commands and responses are organized in frames having six words of 11 bits each with a START bit first, followed by an address bit and ending with a STOP bit with informational bits in between.

Other functions that have been implemented include a device and status retrieval command that reads the response containing the device type code, software version and status bits of the slave. Another command called restart causes the slave to soft-restart including reinitializing internal registers, checking an application select pin, and reading a slot address. A read inventory command allows the master to read 4 bits of EEPROM data at the specified slave address, starting at the specified EEPROM address range. As described above, in connection with the multi-processor serial interface protocol, the memory may be organized as 64 pages of 16 bit registers.

A write in-service command writes two bits of data into an in-service register. A write inventory command allows the master to write 4 bits of EEPROM data the specified slave address, starting at the specified EEPROM address range.

The shelves 12, 14, . . . , 16 described above, may transceive 1.544 Mbit/s data over T1 lines but may also be designed to support extensions of other signals such as serial bus interface signal such as described in co-pending application U.S. Ser. No. (Attorney Docket No. 907-045) entitled "High Speed Port Converter" U.S. Pat. No. 5,060,229 entitled "Serial Transport Frame Format Method" and co-pending application U.S. Ser. No. 07/351,861 entitled "Synchronous Optical Transport System" which are hereby incorporated by reference.

As mentioned, the repeater shelves are powered by two −48 volt DC power distributions designated as "−48 volt A" and "−48 volt B". Fuse requirements are dependent upon the type of printed board assemblies equipped in the shelf. A common ground bus (−48 V RTN) returns current to the office battery. For improved reliability this bus may be equipped with two battery return terminals, but the use of both terminals is of course optional.

As mentioned, the AU position and universal positions 1–15 may but need not be powered from −48 v A. In that case, positions 16–29 and the AU are powered from −48 v B. The AU in that case is the only unit position with both battery distributions (ORed) and available at the back plane.

The internal +5 V power distribution may be connected as a single trace from the AU to each universal (slave) position. Since this is powered by an internal power supply external connections are required. Minus 48 V RTN may be used as the return for +5 v.

Three alarm buses are distributed as wire OR'ed links connecting the AU (position 0) to each universal position. The alarms reported over this bus are fuse alarm, loss of signal and line code error. The signal names for the buses are fuse, alm*', los alm*, and err alm*. The alarm buses intended to operate on −48 v, sourced by the AU. One or more units operating in the universal positions may activate the bus by pulling it low (−48 v RTN).

With regard to alarm outputs, when the shelf is equipped with the AU, 14 alarm output leads are available. The AU generates the alarm outputs based on the state of the internal alarm buses and/or shelf battery voltage failures.

The low speed serial link interface (LSSLI) is a wire ORed link that transfers data between the "smart" AU and the slaves. As further mentioned, the bus operates in a byte synchronous-bit asynchronous mode, at 32 kb/s. As further mentioned, the AU is the master and all others are slaves. The master retrieves data by sending commands to the slaves and then waiting for a response. The slaves may not speak unless first spoken to.

The data is sent in 11 bit words. The first bit is called the "start bit" and always begins as a transition from high to low which signals the start of a word. The start bit remains low for a full bit time (e.g., 31 microseconds). Eight data bits then follow and are interpreted according to the state of the tenth bit, and address/data bit which indicates whether the data in the word is address (if high) or data (if low). The last bit is called the "stop bit" and always a logic high.

After reception of an address word by the slaves, all slaves compare the address value to their address. The slave which has a matching address then must receive, interpret and respond to subsequent command words. All other slaves must continue to monitor the bus for ensuing address words.

The data is normally sent with a checksum value included in the last word. Should a checksum error occur, the slave does not respond. The AU tries to communicate to a particular address up to three times. If after the third try, no response is received it may be assumed that the unit is missing or failed.

For this embodiment of the invention, the interface uses nine pins, two for data, five for address, one for power, and one to supply an oscillator signal to the micro-controller. Data is transmitted by units in the slave positions on a TXD lead and received on a RXD lead. Back plane address pins apply logic 0 (−48 V RTN) and logic one (open pin) such that an incremental binary address (0–28 decimal) is presented on the address pins for positions 1–29, respectively. This approach requires that all ID pins on the printed board assembly be pulled high.

As mentioned, according to an important teaching of the present invention, to gain cost and reliability advantages, +5 volts and the oscillator signal are provided by the AU and supplied to all slave positions.

As also mentioned, the LSSLIs' intended use is for remote inventory, remote provisioning and remote alarm isolation and collection.

The balanced serial link interface (BSLI) is a multi-drop link that transfers data between the "smart" AU and the network control processor. The bus operates in a byte synchronous-bit asynchronous mode at 128 kb/s. The network controller is the master and all AUs are the slaves. The master retrieves data by sending a command to an AU at a specific address and then waiting for a response. The AU slaves may not speak unless first spoken to. The BSLI interface requires four pins, two for transmit data and two for receive data, the address for the AU may be set on the printed board assembly for the AU. The BSLI allows up to sixteen AUs to be addressed and controlled via a single network control.

Although the invention has been shown and described with respect to a best mode embodiment thereof, it should be realized that other embodiments, changes and modifications thereto may be made while still remaining within the spirit and scope of the claimed invention.

I claim:

1. A telecommunications terminal having an automatic inventory retrieval system for collecting inventory and status information relating to printed circuit (PC) boards for use in separate printed circuit board housings of said telecommunications terminal, said telecommunications terminal comprising:
    a cross-connect core, having network controls for providing master PC board address polling signals that occur at a master polling frequency on a terminal bus for providing the master PC board address polling signals; and
    a plurality of said PC board housings, each housing for housing PC boards connected to an associated serial link interface wherein said PC boards for each housing include:
        a plurality of slave PC boards connected to said associated serial link interface, each slave PC board having a selected address in said housing, each slave PC board responsive to slave address polling signals that occur at a slave polling frequency that is greater than said master polling frequency on said associated serial link interface, each slave PC board for providing on the associated serial link interface in response to a matching slave address and slave address polling signal, a slave response signal containing selected inventory and status information; and
        a master PC board for connection to said terminal bus and to said associated serial link interface, for providing the slave address polling signals on said associated serial link interface and responsive to the slave response signals, for providing said slave response signals on said terminal bus in response to a matching one of the master unit address polling signals, the master PC board having a selected master address;
    wherein the cross-connect core is responsive to the slave response signals on said terminal bus from said master PC board for said collecting inventory and status information.

2. A system for collecting status information relating to, printed circuit boards on a terminal bus in a telecommunications terminal having at least one printed circuit board housing for housing said printed circuit boards and a controller to which said at least one printed circuit board housing is connected by said terminal bus, each of said at least one printed circuit board housing having a plurality of circuit boards connected to a housing bus wherein said printed circuit boards include a plurality of slave circuit boards, each slave circuit board having a selected address, each responsive to slave address status request signals provided on said housing bus, each slave unit providing on said housing bus, in response to a slave address status request signal that matches its selected address, a slave address status response signal containing selected status information; wherein said circuit boards include a master circuit board for each of said at least one printed circuit board housing, for providing the slave address status request signals on said housing bus and responsive to the slave address status response signals on said housing bus from the slave circuit boards for providing selected slave address status response signals on said terminal bus in response to a master circuit board address signal on said terminal bus, the master circuit board having a selected master address; said telecommunications terminal having a controller, for providing the master circuit board address signal on said terminal bus and responsive to the selected slave address status response signals from the master circuit board in the at least one printed circuit board housing for said collecting status information.

* * * * *